United States Patent [19]

Saito

[11] 4,142,785
[45] Mar. 6, 1979

[54] EXPOSURE CONTROL CIRCUIT FOR CAMERA

[75] Inventor: Seiichi Saito, Iruma, Japan

[73] Assignee: Nihon Beru-Haueru Kabushiki Kaisha (Bell & Howell Japan, Ltd.), Higashimurayama, Japan

[21] Appl. No.: 860,271

[22] Filed: Dec. 13, 1977

[30] Foreign Application Priority Data

Dec. 16, 1976 [JP] Japan .......................... 51-167811[U]

[51] Int. Cl.² .......................... G03B 7/08; H02J 1/00
[52] U.S. Cl. .......................... 352/141; 354/42; 354/43; 354/60A; 307/85
[58] Field of Search .......................... 352/141; 354/42, 43, 354/44, 59, 60 R, 60 A; 307/43, 85, 86

[56] References Cited

U.S. PATENT DOCUMENTS

| | | |
|---|---|---|
| 3,513,332 | 5/1970 | Snyder .......................... 307/85 |
| 3,987,461 | 10/1976 | Kondo et al. .......................... 354/43 |
| 3,987,462 | 10/1976 | Wagensonner .......................... 354/44 |
| 3,995,285 | 11/1976 | Kondo .......................... 352/141 X |
| 4,007,467 | 2/1977 | Wagensonner et al. .......... 354/60 A |
| 4,050,795 | 9/1977 | Wagensonner et al. ............. 352/141 |

*Primary Examiner*—L. T. Hix
*Assistant Examiner*—William B. Perkey
*Attorney, Agent, or Firm*—Aaron Passman; Roger M. Fitz-Gerald

[57] ABSTRACT

Disclosed is a circuit for automatically intermittently sensing adequate ambient light conditions and adjusting a cine camera iris for same. The circuit includes an astable multi-vibrator for intermittent switching of power to a Cds cell. Under low light conditions the resistance of the cell becomes great enough to stop the oscillations of the multi-vibrator.

8 Claims, 1 Drawing Figure

EXPOSURE CONTROL CIRCUIT FOR CAMERA

BACKGROUND OF THE INVENTION

This invention relates to automatic motion picture cameras which include an electronic automatic exposure system. In the past such systems have included a galvanometer type motor for automatically closing the iris of the lens in accordance with the incoming light. Such motor systems were fragile and therefore subject to damage caused by rough handling of the camera or wear and tear resulting from ordinary use. In an effort to improve upon such systems a servo motor was added to permit the use of rugged components and bearings which would overcome the aforementioned problem. This use of a servo motor effectively circumvented the reliability problems but added a new problem in that excessive power consumption was required if such a system was permitted to stay on when the camera was not being used to feed film for shooting. It was necessary to leave the automatic electronic exposure control on because the camera would not be ready to shoot on an instantaneous basis without having the iris preset. A number of techniques were applied in order to overcome the high power consumption of the rugged automatic electronic exposure control while maintaining the camera in ready condition. For example, double switches were applied to the camera such that the automatic electronic exposure control would have to be energized first before the trigger which operated the film advance could be turned on. Even though such switching was relatively effective in conserving power, delays occurred in starting the shooting and a certain level of spontaneity was lost as a result. Consequently, the ability to film the scene instantaneously was prevented by those systems.

SUMMARY OF THE INVENTION

The improvement of the present system is an electronic circuit which intermittently activates the electronic exposure in order to keep the camera exposure system apprised of the ambient light conditions. Such a system could use a multi-vibrator circuit which will stop the intermittent operation of the exposure control when the ambient light becomes less than a predetermined value; such as, for example, during storage when the ambient is less than necessary for taking pictures.

DETAILED DESCRIPTION OF THE DRAWINGS

Figure 1:
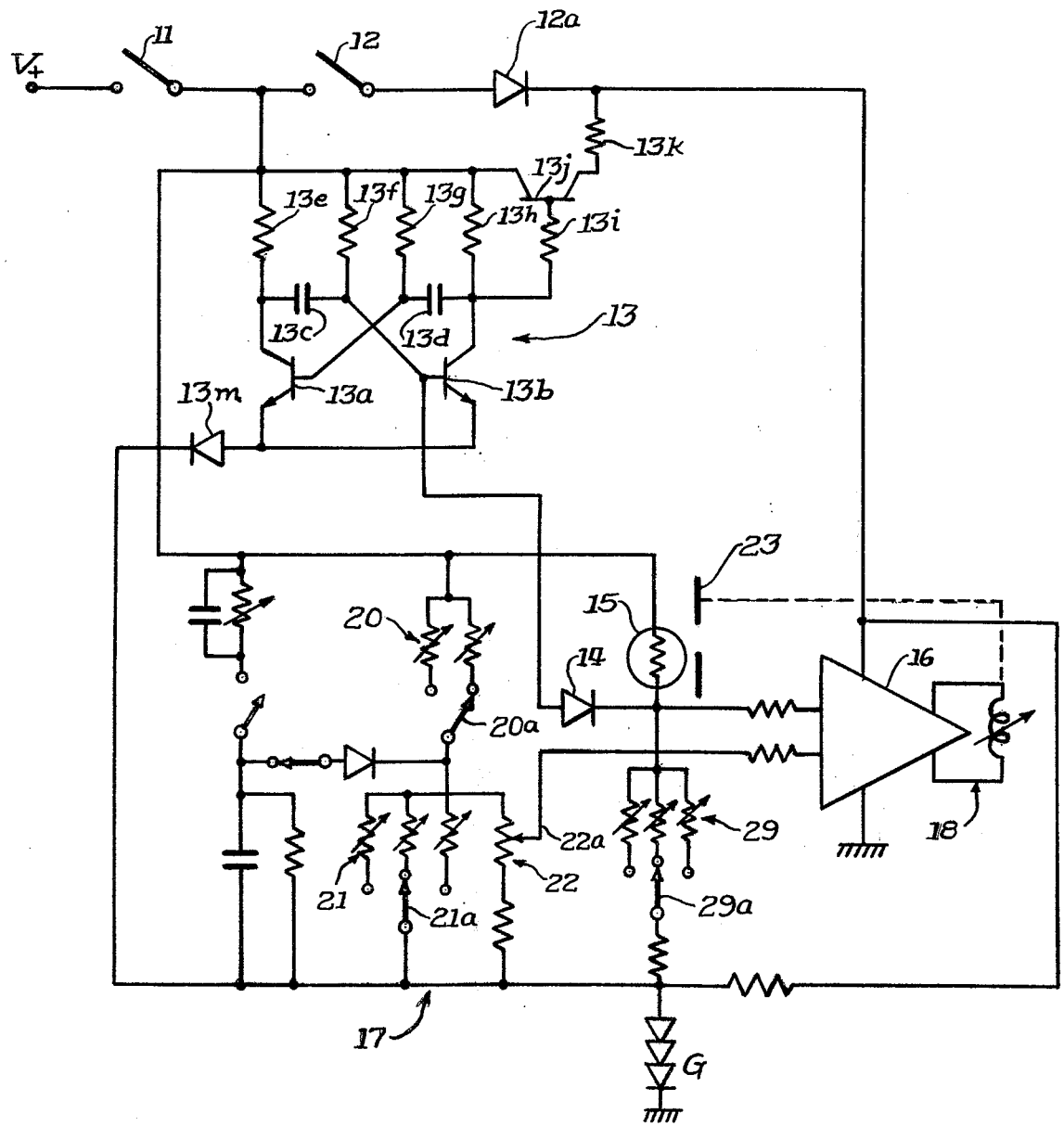
FIG. 1 is a circuit diagram showing an oscillator for intermittently activating the exposure control circuit when the camera is turned on but is not being used to film.

FIG. 1 shows a schematic circuit diagram for an automatic exposure control circuit for use in a camera which includes an automatic switching apparatus for intermittently motoring the ambient light when the camera is turned on but is not being used for filming.

In FIG. 1 there are three sections of the circuit. There is an astable multi-vibrator 13 which acts as an oscillating switch to set up intermittent switching at a predetermined frequency for activating the automatic exposure control. Also included in FIG. 1 is a bridge circuit for adjusting the camera functions and modifying the sensitivity of the automatic exposure circuit in accordance therewith. Finally, there is the automatic exposure circuit which consists of a photo responsive cell located aft the camera iris and responsively connected to a servo system for adjusting the iris.

The circuit includes a power supply indicated by the "V+" which supply is connected in series with the main power switch 11. Aft of the main power switch there is a branched circuit, one branch connected to a pre-exposure switch 12 which is part of the camera trigger assembly, and the other branch is in series with an astable multi-vibrator 13. The astable multi-vibrator 13 is an oscillator connected to receive power when the main switch 11 is closed and to intermittently transmit said power across the open circuit of switch 12 thereby circumventing same. The frequency of multi-vibrator 13 is predetermined to be of a value sufficient to keep the exposure control circuit responsive to the ambient conditions such that the camera will be ready for use when the main pre-exposure switch 12 is closed. A frequency giving 10 percent on time has been found to be good.

Astable multi-vibrator 13 includes a pair of transistors 13a and b which are respectively responsive to resistor capacitor circuits. For transistor 13a there are resistors 13g and h and capacitor 13d connected between the power supply and the base thereof. Similarly, for transistor 13b there are resistors 13e and f and capacitor 13c connected between the power supply and the base thereof. In a manner well known the astable multi-vibrator 13 oscillates at a predetermined frequency such that current flowing through current limiting resistor 13i to the base of transistor 13j causes same to be intermittently conductive. To prevent reverse flow of current from multi-vibrator 13 when switch 12 is closed, there is a diode 12a in series with switch 12 between it and the connection for multi-vibrator 13. Multi-vibrator 13 is also connected to the common ground G through a diode 13m. Furthermore, an oscillating output from the resistor capacitor circuit for the base of transistor 13b is connected in series with an input for the exposure control amplifier 16.

The exposure control circuit sensitivity is adjusted by a bridge circuit 17. The four resistances of the bridge circuit are: (1) the resistance of a Cds photo responsive cell 15 which is positioned aft of the camera iris 23 for detecting incoming light; (2) a group of three variable resistors 29 any one of which may be selected by a three-position switch 29a thereby setting the film sensitivity (ASA or DIN speed) of the camera; (3) a group of three variable resistors 21 any one of which may be connected by a three-position switch 21a for adjusting the camera sensitivity to background contrast of the object and (4) a group of two variable resistors 20 either of which may be selectively connected by a two-position switch 20a for setting the film feeding speed. Those skilled in the art will appreciate that the foregoing bridge circuit will set the sensitivity level and response thresholds for the Cds cell 15. More particularly, the bridge circuit is such that the input from the base of transistor 13b to the meter amplifier 16 is also connected as an input to the Cds cell 15. A diode 14 is connected between the base of transistor 13b and the inputs to cell 15 and amplifier 16 such that current can only flow in toward the amplifier 16.

The other input to meter amplifier 16 comes from a subcircuit 22 which consists of a pair of resistors, one being a variable resistor 22a, that are connected between resistor group 21 and ground. Resistors 22 have resistance values such that the bridge circuit 17 is balanced (no current flows in the bridge circuit) when the photo cell 15 receives the proper volume of light through the iris 23. That is to say that, the iris 23 is properly adjusted for the ambient light conditions. However, when the ambient conditions are such that the iris is maladjusted, the photo conductive element receives an improper volume of light causing the bridge circuit 17 to become unbalanced thereby activating meter amplifier 16 which becomes operative and activates a servo motor 18 adjusting the iris 23 until the bridge circuit 17 is once again in balance.

It is apparent that the resistance of Cds cell 15 increases when the volume of light decreases such that the base voltage of transistor 13b becomes lower than the emitter voltage. The oscillation of astable multi-vibrator 13 is stopped so that multi-vibrator 13 will not function under conditions of low light and therefore, the intermittent bypass provided for the switch 12 ceases to exist.

In operation the circuit of the present invention permits the automatic exposure control system to intermittently operate when the camera is turned on but not being operated. Consequently, the camera is instantaneously ready for use as long as the camera exposure system senses adequate ambient light. The operator of the camera can carry the camera all day and be able to instantaneously use it. However, once the camera is placed in its storage case the ambient light is decreased to a level whereby the intermittent sensing system is automatically disconnected. More particularly, the system allows the camera to immediately function at the proper exposure if the ambient light is adequate. Under inadequate light conditions the system is automatically turned off, thereby conserving battery power.

While a particular circuit has been shown for automatically intermittently sensing adequate ambient light conditions and adjusting the camera iris for same, those skilled in the art will appreciate that various changes and modifications can be made in the circuit which will function in the same manner to perform the same result. Therefore, the attached claims are intended to cover the invention in its broader aspects.

What is claimed is:

1. A camera lens for use with a camera adjustable for various film speeds and having an automatic exposure control system for intermittent use when the camera is not being operated to sense ambient conditions comprising:

an exposure control circuit having a photo responsive sensor for sensing ambient light conditions and transmitting a signal relative to the ambient conditions;
   a control means associatively connected to said photo responsive sensor for adjusting the lens opening of the camera in accordance with said signal;
   an intermittent switching means for periodically connecting and disconnecting said automatic exposure control circuit to a power supply at a predetermined frequency;
   an automatic disconnecting means within said intermittent switching means for interrupting the connection to said power supply when the ambient light conditions are below the level necessary for film exposure.

2. The system of claim 1 wherein said photo responsive sensor is connected to a circuit to control the responsiveness of said sensor in accordance with the speed of the film to be used.

3. The system of claim 2 wherein said photo responsive sensor is a photo resistive element connected as a first leg of a resistance bridge circuit.

4. The system of claim 3 wherein a film speed circuit includes a plurality of variable resistances anyone of which can be selectively connected as a second leg of said resistance bridge circuit thereby setting the light sensitivity level for said adjustable camera.

5. The system of claim 4 wherein a third leg of said resistance bridge circuit is a plurality of adjustable resistors, any of which can be selectively connected to set the level for the film feeding speed.

6. The system of claim 5 wherein the fourth leg of said bridge circuit includes a plurality of adjustable resistors, any of which may be selectively connected to set the level of background contrast for the system.

7. The system of claim 6 wherein said automatic disconnecting means includes a transistor connected to said resistance bridge circuit such that low level light conditions cause the bridge to unbalance thereby causing said transistor base voltage to be lower than the emitter voltage for interrupting said intermittent switching and disconnecting said exposure control circuit.

8. The system of claim 1 wherein said intermittent switching means includes an astable multi-vibrator connected to the base of a switching transistor said multivibrator and switching transistor being wired in parallel across a pre-exposure switch.

* * * * *